Figures 1, 2:
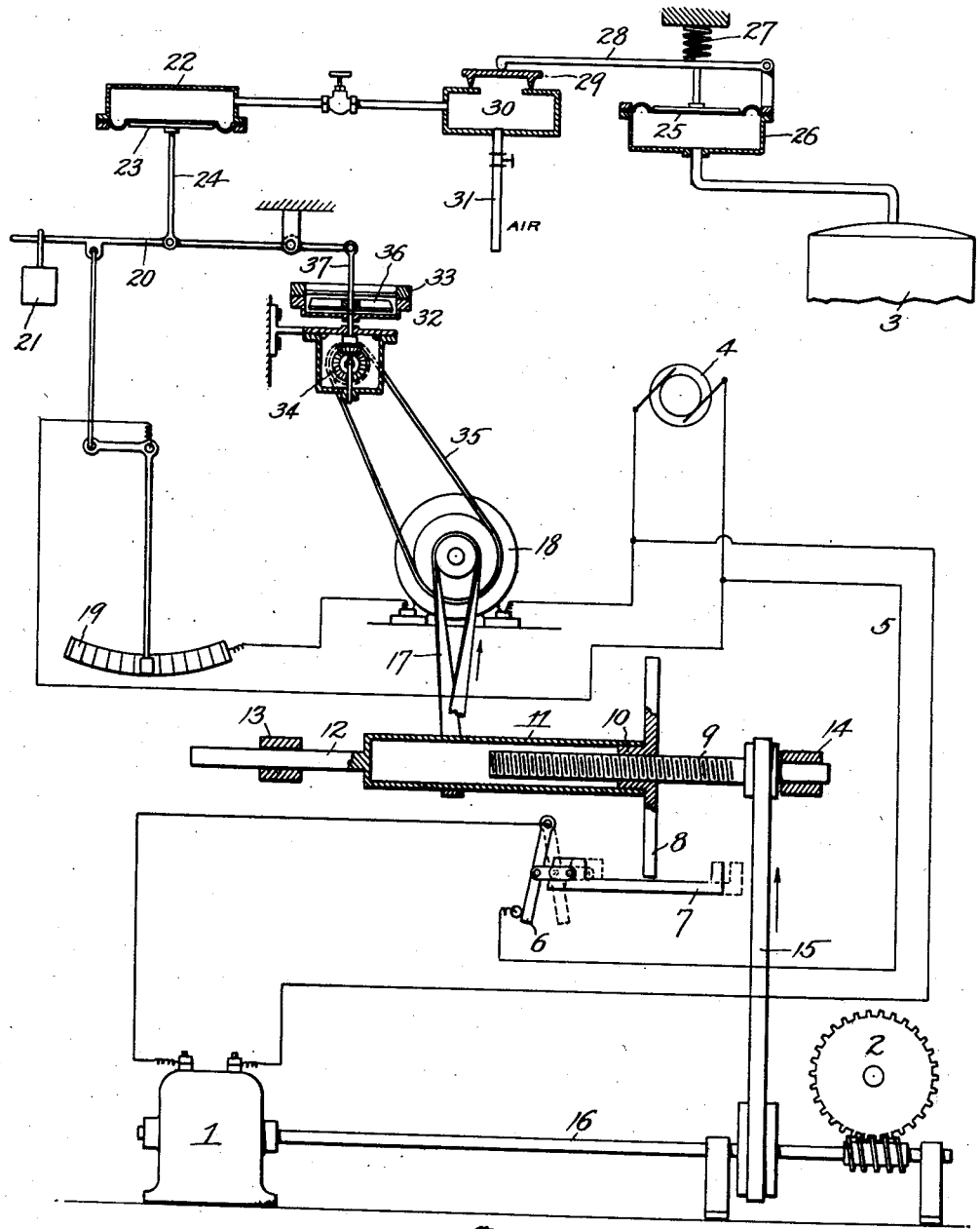

June 26, 1928.

C. H. SMOOT

CONTROL FOR INTERMITTENT MOTORS

Filed Jan. 13, 1925

1,675,062

WITNESSES
Oliver W. Holmes

INVENTOR
Charles H. Smoot
BY
Knight Bro.
ATTORNEYS

Patented June 26, 1928.

1,675,062

UNITED STATES PATENT OFFICE.

CHARLES H. SMOOT, OF MAPLEWOOD, NEW JERSEY.

CONTROL FOR INTERMITTENT MOTORS.

Application filed January 13, 1925. Serial No. 2,137.

This invention relates to motors, which, running at a constant speed, have a variable amount of work to perform, and accomplish this by intermittent operation, running almost or quite continuously when the work is at a maximum and stopping at greater or less frequency or for greater or less periods of time, according to the ratio between the work being done at the time and the maximum work.

The invention comprises means for accomplishing this automatically, by a governing device and specifically it comprises a variable speed motor combined with a speed governor located at a control point, with means for varying the load of the speed governor in proportion to the requirements and differential mechanism between the intermittent motor and the speed governor motor, whereby when the intermittent motor runs faster than the speed governor motor for a longer or shorter period, the intermittent motor will be stopped and again started after a longer or a shorter period when the regulating motor in continuing its motion, moves the differential mechanism in the reverse direction. Further objects and features of the invention will be explained in connection with the accompanying drawing, in which:

Figure 1 is a diagrammatic view of apparatus embodying my invention.

Figure 2 is a diagrammatic view of a detail of a modification.

In the drawing, 1 represents an electric motor which is intended to drive intermittently a mechanism 2, which may, for example, be a stoker feeding coal to the furnace of a boiler 3. 4 is a generator furnishing power through circuit 5 to the intermittent motor in which circuit is interposed a make and break switch 6. This switch has connected with it a lost motion device 7 and movable back and forth between the flanges of this device is a disk member 8, which is an intermediate member of a differential mechanism, the other members being respectively represented by the screw 9 and the nut 10 that operate thereon. The nut 10 is attached to the disk 8 and has a cylindrical pulley extension 11 whose shaft 12, at the outer end, runs in bearing 13. The screw 9 has its outer end resting in bearing 14. The screw is driven by belt 15 from the shaft 16 that connects the intermittent motor 1 with the work 2. The screw 9, therefore, runs only when the motor is running. The other member, however, consisting of the nut 10 and pulley 11 with its attached disk 8, runs continuously, being driven by a belt 17 from a motor 18, supplied with current from any suitable source, as for instance, the generator 4. The function of the motor 18 is to determine how much of the time the intermittent motor 1 shall be working and how much of the time it shall be idle. It is evident that if the motor 18 runs at a speed which may be called its maximum speed, the parts may be so adjusted that the nut 10 and the screw 9 will revolve at the same speed. In such case, the member 8 would travel neither to the right nor to the left, and the intermittent motor would continue to run as long as this condition held. Should, however, the demands of the work require a stoppage of the motor 1 to prevent the work being overdone, the controlling devices (described below) will cause a slowing down of the control motor 18, whereupon the screw 9 running faster than the nut 10, will draw the intermediate member 8 to the right until it engages with lost motion member 7 and causes on opening of the switch 6 and consequent stopping of the intermittent motor 1. When said motor thus is stopped, the nut 10 continuing to run, will now move the intermediate member 8 in the opposite direction until after a proper lapse of time the said member engages the lost motion member 7 at the other end of its travel and closes the switch 6, which again starts the intermittent motor 1. During such intermittent operation of the motor 1, the intermediate member 8 will thus travel back and forth between the limits of the lost motion member 7, its travel in the direction to close the circuit being quicker than its travel in the reverse direction the latter being in proportion to the differential between the maximum work required of the motor and the work at the time dictated by the motor 18.

From the above it will be clear that the motor 18, which, so to speak, sets the pace for the work motor, must itself be responsive to the requirements of the work. In other words, it should run faster, the greater the requirements, and slower the less the requirements. To vary its speed in accordance with the requirements, I have shown, for example, connected in circuit with the motor 18 a rheostatic device 19 which is connected with lever 20. The lever 20 may, for example, have a loading weight 21 tending to increase the speed of the motor by cutting out resistance 19 so that the motor 18 will tend to run at a maximum speed through the influence of the loading means. The loading means, however, are in turn controlled by two other forces. One is a force due to air pressure in chamber 22 acting on diaphragm 23 and from thence by rod 24 on lever 20. The air pressure 22 is made to vary inversely with the steam pressure in boiler 3. The steam pressure acting on diaphragm 25 of chamber 26 operates against the force of a spring 27 to move a lever 28, which causes a valve 29 to regulate the amount of air escaping from chamber 30 supplied thereto by pipe 31 from a source of compressed air. From this it will appear that as the steam pressure increases in chamber 26, the leakage from chamber 30 will increase and the pressure in chambers 30 and 22 will decrease and the ratio of this latter change may be made very much greater than the ratio of the change in steam pressure. To check the operation of the loading device and the work requirement device just described, a centrifugal governor 32, driven by the motor 18, acts to counterbalance the other forces acting on lever 20 to arrest or check the action of such other forces when, by virtue of the action of such forces, the speed of the motor 18 has attained to the new speed required by the change in the working conditions. The centrifugal governor is shown as consisting of a rotatable casing 33 driven by bevel gears 34 and belt 35 from the motor 18, which acts to create a force to raise or lower a stationary member 36, the said raising and lowering force being proportionate to the speed of the casing 33. This is accomplished by having the casing filled with liquid, which, as the governor runs faster, causes a partial vacuum underneath the member 36, resulting in a downward force upon its pin 37 that is connected to the lever 20. The construction of this governor is described in order to show clearly how the mechanism works, but it forms no part of the present invention.

From the above description it will be evident that the regulating motor 18 tends to run faster as the steam pressure decreases, the immediate result of which is to tend to keep the intermittent motor running and increase the supply of fuel under the boiler while at the same time the speed governor being connected in opposition to the steam effect can be adjusted to check this tendency to increased speed at just the right speed that will give the desired increase in fuel feed. The weight 21 being adjustable on the lever 20 furnishes a ready means of adjustment.

The pilot motor 18, sets the average pace of the work motor 1. It will sometimes lead and sometimes lag, but the difference in the ratio between the number of revolutions of the two motors will never exceed a certain small number as determined by the parts 7–8–9 and 10. This small difference becomes of negligible proportion to the total number of revolutions in the course of time, so that the total revolutions of the two motors approximate a definite ratio.

Instead of having the motor 1 started and stopped intermittently to vary the work being done, it is possible, and, in case of alternating current motors, preferable to have the motor run continuously, in which case it is desirable to introduce a clutch instead of an electric switch, such clutch being put in the shaft 16 as shown in Figure 2. Here the lost motion member 7 moves the sliding member 60 of the clutch into and out of engagement with the non-sliding member 61 according to whether the intermediate member 8 strikes on the right hand or the left hand side of the lost motion member 7. In other respects, the operation is the same as described in connection with the electric switch, the clutch being quicker to close and slower to open in proportion to the work required. While I have shown specific examples of apparatus suitable for carrying out my invention as the law requires, I do not wish to be limited thereto, as many equivalents will occur to those skilled in the art, which would serve equally well.

I claim:—

1. In a controller for intermittently operating motors, the combination with such motors of a variable speed regulating motor, means responsive to changes in work requirement cooperating with means responsive to speed of the regulating motor to jointly control the speed of the regulating motor, differential mechanism driven by both the intermittent motor and the regulating motor, and an intermediate member of said mechanism which acts to start or stop the intermittent motor according to which of the motors gains on the other.

2. In a controller for intermittently operating motors, the combination with such motors of a variable speed regulating motor, means responsive to changes in work requirement cooperating with means responsive to speed of the regulating motor to jointly control the speed of the regulating motor, differential mechanism, one member of which is driven by the intermittent motor, another member by the regulating motor, and an intermediate member that is moved one way or the other according to the differential speed of the two motors to stop the intermittent motor at one end of the travel of the intermediate member and to start the said motor when the said member is at the other end of its travel.

3. In a controller for intermittently operating motors, the combination comprising an intermittent motor, means responsive to the work requirements, a regulating motor, a speed governor driven thereby, an adjustable loading means, a differential mechanism between the motors whereby the regulating motor causes the starting and stopping of the intermittent motor to be a function of the speed of the regulating motor, means tending to vary the speed of the regulating motor in proportion to the work required, and means controlled jointly by the speed governor, the work responsive means and the adjustable loading means to control the speed of the regulating motor.

4. In a motor control system, the combination of a work motor and control switch for same, with means for operating the switch comprising a pilot motor adapted to operate at varying speeds, means responsive to variable work requirements for varying the speed of the pilot motor, a centrifugal governor driven by said pilot motor, acting to check such variations in speed, and differential means operated conjointly by the pilot motor and the work motor for operating the control switch of the work motor whereby the total revolutions of the work motor will, over a period of time, be made to bear an approximate definite ratio to the total revolutions of the pilot motor.

5. In a motor control system, the combination of a work motor and control switch for same, with means for operating the switch comprising a pilot motor adapted to operate at varying speeds, master control means responsive to variable work requirements for varying the speed of the pilot motor, a centrifugal governor driven by said pilot motor, acting to check such variations in speed, and differential means operated conjointly by the pilot motor and the work motor for operating the control switch of the work motor whereby the total revolutions of the work motor will, over a period of time, be made to bear an approximate definite ratio to the total revolutions of the pilot motor.

6. In a motor control system, the combination of a work motor and control switch for same, with means for operating the switch comprising a pilot motor adapted to operate at varying speeds, master control means responsive to variable work requirements for varying the speed of the pilot motor, a centrifugal governor driven by said pilot motor, acting to check such variations in speed, with means at the master controller for adjusting the effect of the master controller on the governor, and differential means operated conjointly by the pilot motor and the work motor for operating the control switch of the work motor whereby the total revolutions of the work motor will, over a period of time, be made to bear an approximate definite ratio to the total revolutions of the pilot motor.

7. A controller for approximating the total revolutions over a given time of a work member adapted to run at fixed speeds to the total revolutions over the same time of a pilot member adapted to run at a variable speed, comprising a reciprocating control member oppositely operated upon by the work member and pilot member, means operated by the control member only at one end of its stroke to increase the speed of the work member and only at the other end of its stroke to decrease the speed of the work member.

8. In a motor control, the combination of a work motor and a pilot motor with members driven by the motors, the member driven by the pilot motor being normally variable in speed through a certain range, a controller for the work motor operative to vary the speed of the work motor and its driven control member through a greater speed range, and means responsive to the differential in speed between the members for operating said controller to effect intermittently the variation in speed of the work motor member throughout the range thereof.

9. In a motor control, the combination of a work motor and a variable speed pilot motor, with a controller for varying the operating speed of the work motor and a drive mechanism for the controller including means responsive to the differential in speeds between the motors for varying the speed of the work motor with reference to the speed of the pilot motor for appreciably long periods of time.

10. In a motor control, the combination of a work motor, a pilot motor, a member driven by the work motor, a member driven by the pilot motor, the latter member being driven normally by the pilot motor at varying speeds through a certain range, a controller for the work motor driven by the differential in speeds between the driven members and operable to vary the speed of the work motor driven member through a speed range greater than the range in variation of the pilot motor driven member.

11. In a control for intermittently operating motors, the combination with such a motor of a variable speed regulating motor, shafts adapted to be driven by said motors, differential mechanism operated from said shafts, an intermediate reciprocating member of said mechanism and means controlled thereby which acts to start or stop the shaft driven by the intermittent motor according to which of said shafts is running the faster.

12. In a motor control, the combination of a work motor and a variable speed pilot motor and members driven thereby, with a controller for varying the operating speed of the member driven by the work motor and a drive mechanism for the controller including means responsive to a variation in the ratio between the speeds of said members for changing the speed of said work motor driven member with reference to the speed of the pilot motor driven member for appreciably long periods of time.

CHARLES H. SMOOT.